United States Patent [19]

Kuriyama et al.

[11] Patent Number: 4,963,232
[45] Date of Patent: Oct. 16, 1990

[54] PROCESS FOR PRODUCING A PURIFIED HYDRAZINE HYDRATE

[75] Inventors: Yasuhisa Kuriyama, Yokkaichi; Shuuzabu Sakaguchi, Toride; Toshiaki Kohzaki, Ushiku; Syoichi Nito, Yokkaichi, all of Japan

[73] Assignee: Mitsubishi Gas Chemical Company, Inc., Tokyo, Japan

[21] Appl. No.: 355,188

[22] Filed: May 22, 1989

Related U.S. Application Data

[63] Continuation-in-part of Ser. No. 198,493, May 25, 1988, abandoned.

[30] Foreign Application Priority Data

May 28, 1987 [JP] Japan ................. 62-129773

[51] Int. Cl.$^5$ .................. B01D 3/34; C01B 21/16
[52] U.S. Cl. .................. 203/29; 203/12; 203/33; 203/53; 203/71; 203/73; 203/74; 203/75; 203/78; 203/81; 203/82; 203/84; 423/407; 568/383
[58] Field of Search ........... 203/33, 29, 53, 81, 203/82, 84, 71, 73, 74, 75, 78, 12, 36, 37; 423/407, 408; 568/383

[56] References Cited

U.S. PATENT DOCUMENTS

| | | | |
|---|---|---|---|
| 2,799,631 | 7/1957 | Von Hessert et al. | 203/33 |
| 3,010,790 | 11/1961 | Rahlfs et al. | 203/71 |
| 3,028,219 | 4/1962 | Rahlfs et al. | 203/71 |
| 3,607,041 | 9/1971 | Ellis et al. | 423/407 |
| 3,740,436 | 6/1973 | Rigsby | 423/407 |
| 3,869,541 | 3/1975 | Weiss et al. | 423/407 |
| 3,883,401 | 5/1975 | Schirmann et al. | 423/407 |
| 4,725,421 | 2/1988 | Schirmann et al. | 423/407 |

FOREIGN PATENT DOCUMENTS

| | | | |
|---|---|---|---|
| 1137720 | 10/1962 | Fed. Rep. of Germany | 423/407 |
| 1282617 | 11/1968 | Fed. Rep. of Germany | 423/407 |
| 42-653 | 1/1967 | Japan | 423/407 |
| 57-38312 | 3/1982 | Japan | 423/407 |

OTHER PUBLICATIONS

Patent Abstracts of Japan, vol. 5, No. 124 (C-66) [796], 11 Aug. 1981.

*Primary Examiner*—Wilbur Bascomb
*Attorney, Agent, or Firm*—Wenderoth, Lind & Ponack

[57] ABSTRACT

Provided by this invention is a process for producing a purified hydrazine hydrate having a low total organic carbon concentration and which involves:

a first step which includes distilling an aqueous solution of hydrazine hydrate in the presence of at least one salt selected from the group consisting of chloride, sulfate, phosphate and carbonate of (a) the metals of Group Ia and IIa of the Periodic Table of the Elements, (b) ammonium or (c) hydrazinium to concentrate the aqueous solution of hydrazine hydrate by distilling water and the majority of the total organic carbon constituents off and separating the resultant concentrate as a bottom product, and a second step which includes distilling the resultant concentrate to recover a purified aqueous solution of hydrazine hydrate as a top product and separating an aqueous solution of the above salt as a bottom product.

14 Claims, 2 Drawing Sheets

PROCESS FOR PRODUCING A PURIFIED HYDRAZINE HYDRATE

This application is a continuation-in-part of now abandoned application Ser. No. 198,493, filed May 25, 1988.

FIELD OF THE INVENTION

This invention relates to a process for producing a purified hydrazine hydrate by reducing the total organic carbon (TOC) concentration in hydrazine hydrate produced from ketazine.

DESCRIPTION OF THE PRIOR ART

Hydrazine is used in boiler cleaning agents, foaming agents, agricultural chemicals, pharmaceuticals, industrial chemicals, etc., and a high concentration of TOC constituents in hydrazine is undesirable in some cases, e.g., when it is used as a material for pharmaceuticals, foaming agents requiring strict accuracy, and the like.

The process for synthesis of hydrazine from a ketazine, in general, comprises oxidizing ammonia with an oxidizing agent such as sodium hypochlorite, hydrogen peroxide etc., in the presence of a ketone to produce ketazine, hydrolyzing the resultant ketazine to produce hydrazine hydrate and further purifying the resultant hydrazine hydrate by distillation. The TOC constituents in the finally produced hydrazine hydrate differ depending upon what oxidizing agent and ketone are used to produce ketazine and what process is used for hydrolysis of the ketazine to obtain hydrazine. However, even hydrazine purified by distillation usually has a TOC concentration of between 500 ppm and 1,500 ppm if no further special purification procedure is taken. The TOC concentrations mentioned in this specification with regard to prior art stand for weight ratios of TOC to hydrazine hydrate.

At the step for producing ketazine by using an oxidizing agent, ketone and ammonia, it is difficult to obtain completely pure ketazine. Condensation products of ketone with ammonia and their oxides are always formed as impurities. The majority of these impurities can be removed by the procedure of distillation. However, some impurities, which behave similarly to ketazine, are difficult to remove. Thus, the resultant hydrazine hydrate has a high TOC concentration.

Hydrazine hydrate obtained by hydrolysis of ketazine contains substances formed from impurities contained in ketazine, by-products formed from ketazine during its hydrolysis, unreacted ketazine, a hydrazone which is a hydrolysis intermediate, etc.

Distillation, concentration or rectification of hydrazine hydrate obtained by hydrolysis of ketazine can give an aqueous solution of hydrazine hydrate from which the majority of the impurities are removed.

However, there are a diversity of impurities. The volatilities of the impurities relative to hydrazine also vary from small relative volatilities to large ones. There are some impurities having relative volatilities very close to that of hydrazine, and these impurities can be removed only when an ultra-accuracy distillation is carried out at the sacrifice of economy. It is difficult to remove these impurities to a low level by ordinary distillation procedures.

Therefore, hydrazine hydrate obtained by such ordinary distillation procedures usually contains about 500 to 1,500 ppm of TOC derived from these impurities.

The above-mentioned impurities, in addition to unreacted materials and reaction intermediates such as ketazine, hydrazone, diazacyclopropane, etc., are an alcohol, ketoalcohol, unsaturated ketone, condensation product of ketones, condensation product of ketone with ammonia and reaction products of these compounds with hydrazine. Examples of the above impurities include various alcohols, ketones, amines, amides, oximes, hydrazine compounds such as hydrazides, azine derivatives, etc., and heterocyclic compounds such as pyrazine, pyrazole, pyrazoline, pyrrol, pyridine, pyridazine, triazole, imidazole, etc. Thus, there are various types of impurities.

In order to remove the above impurities in hydrazine hydrate, in general, there are steps to take, such as distillation, liquid-liquid extraction, adsorption, etc.

As previously mentioned, however, there is a limit to the distillation by an ordinary removal procedure, and a resultant hydrazine hydrate therefore has a TOC concentration of about 500 to 1,500 ppm.

The liquid-liquid extraction method is effective to some extent. However, some impurities have too low distribution coefficients to be extracted sufficiently. Thus, the lowest TOC concentration that can be economically achieved by this method is between 300 ppm and 600 ppm.

Further, there can be means of adsorption. For example, when activated carbon is used to remove the impurities, the TOC concentration can be comparatively easily reduced to about 300 ppm. However, the activated carbon has defects that the presence of a large amount of impurities requires frequent reactivation thereof, causing extreme consumption of the activated carbon; that the activated carbon usually decomposes hydrazine hydrate, thus causing a large loss of hydrazine hydrate; that a foaming takes place in adsorption operation, thus causing an operational difficulty; and the like. A synthetic adsorbent does not decompose hydrazine and gives a similar adsorption effect to that of the activated carbon. However, the synthetic adsorbent is expensive and similarly requires frequent reactivation thereof when an amount for the treatment is large. Therefore, the lowest TOC concentration economically accomplishable by the adsorption is about 300 ppm.

German Patent No. 1,282,617 discloses a process for producing hydrazine, which comprises adding methyl ethyl ketone to an aqueous solution of hydrazine hydrate and NaCl, distilling the mixture to distill out hydrazine hydrate together with methyl ethyl ketone and diethyl ketone, recovering hydrazine hydrate as ketazine, and then hydrolyzing ketazine. The object of the German Patent above is to separate hydrazine hydrate from NaCl, and there is no disclosure with regard to a process for removal of TOC constituents in hydrazine.

An aqueous solution of hydrazine hydrate obtained by oxidation of ammonia or urea with sodium hypochlorite contains NaCl, NaOH and sodium carbonate. U.S. Pat. No. 2,799,631 describes a process for separating hydrazine hydrate from salt components by evaporating hydrazine hydrate and water from the above aqueous solution. The above U.S. Patent therefore discloses that hydrazine can be easily separated from the salt components by evaporating the above aqueous solution while adding the aqueous solution to a solution containing 30% to 50% by weight of caustic soda at a temperature of 125° to 150° C. Thus, the above U.S. Patent does not disclose anything concerning removal of TOC from an aqueous solution of hydrazine hydrate.

SUMMARY OF THE INVENTION

The object of this invention is to provide a process for producing a purified hydrazine hydrate having a low TOC concentration.

Another object of this invention is to provide an economical and easily operatable process for producing a purified hydrazine hydrate having a low TOC concentration.

This invention provides a process for producing a purified hydrazine hydrate having a low total organic carbon concentration comprising:

a first step which comprises distilling an aqueous solution of hydrazine hydrate in the presence of at least one salt selected from the group consisting of chloride, sulfate, phosphate and carbonate of (a) the metals of Group Ia and IIa of the Periodic Table of the Elements, (b) ammonium or (c) hydrazinium to concentrate the aqueous solution of hydrazine hydrate by distilling water and the majority of the total organic carbon constituents off and separating the resultant concentrate as a bottom product, and a second step which comprises distilling the resultant concentrate to recover a purified aqueous solution of hydrazine hydrate as a top product and separating an aqueous solution of the above salt as a bottom product.

DETAILED DESCRIPTION OF THE INVENTION

Figure 1:
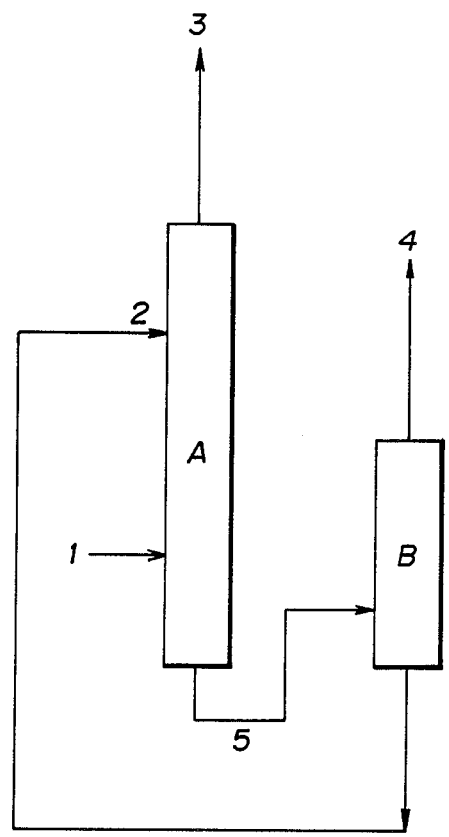
FIG. 1 is a flow chart showing a preferred embodiment of this invention including a step of concentration-distillation and a step of distillation and recovery of an aqueous solution of hydrazine hydrate.

In this specification, the "TOC" stands for all of the carbon containing organic compounds in an aqueous solution of hydrazine hydrate, and the "TOC concentration" represents a weight ratio of TOC to the aqueous solution of hydrazine hydrate. As the hydrazine hydrate to be purified, this invention uses an aqueous solution of hydrazine hydrate obtained by reacting ammonia with an oxidizing agent in the presence of ketone to produce ketazine and hydrolyzing the ketazine, or an aqueous solution of hydrazine hydrate pre-purified by distilling the obtained aqueous solution of hydrazine hydrate.

The process of this invention comprises two steps. The first step comprises adding an aqueous solution of a chloride, sulphate, etc., to an aqueous solution of hydrazine hydrate and distilling the mixture to distill the majority of TOC constituents out together with water. The second step comprises distilling the bottom product of the first step in which the majority of TOC constituents is distilled out, to both obtain the hydrazine hydrate having a low TOC content and recover concentrated salts. The salts recovered in the second step may be recycled to the first step.

For convenience, the above first step is referred to as "concentration-distillation step" and the above second step as "hydrazine hydrate distillation step" hereinbelow.

In the concentration-distillation step, an aqueous solution of hydrazine hydrate is distilled in a column in the presence of the above salt, and water containing almost no hydrazine is distilled out of the column top and a mixture of the salt and an aqueous solution of hydrazine is taken out of the column bottom. The majority of TOC constitutents are contained in water which is distilled out of the column top. In order to distill out water containing almost no hydrazine, it is necessary to consider the number of stages and the reflux ratio (necessary in chemical engineering) to separate water and hydrazine.

For example, when an aqueous solution containing 40% by weight of hydrazine hydrate is supplied to the concentration-distillation step, the necessary, theoretical number of stages and reflux ratio are not less than 4 and not less than 0.3, respectively, and preferably not less than 6 and not less than 0.5.

Preferably usable in the concentration-distillation step are salts which do not undergo a reaction to change the structure of hydrazine hydrate but have high solubility. Such salts are chlorides, sulphates, phosphates and carbonates of (a) the metals of Group Ia and IIa of the Periodic Table of the elements, (b) ammonium or (c) hydrazinium. Examples of the chlorides include lithium chloride, sodium chloride, potassium chloride, magnesium chloride, calcium chloride, barium chloride, strontium chloride, ammonium chloride, hydrazinium monochloride, etc. examples of the sulphates include sodium sulphate, potassium sulphate, magnesium sulphate, ammonium sulphate, dihydrazinium sulphate, etc. Examples of the phosphates include sodium phosphate, potassium phosphate, hydrazinium phosphate, etc. And examples of the carbonates include sodium carbonate, potassium carbonate, etc. Among these, the sulphates are more preferably used, and in particular, dihydrazinium sulphate is preferably used.

The higher the concentration of these salts is in the system, the easier is the separation between hydrazine and TOC constituents. This tendency is scarcely affected by a change in the water concentration in the system.

However, there are some exceptions to the above tendency. Separation of some of the TOC constituents, e.g., amide compounds (to be referred to as "low volatile substances" hereinbelow) is not made much easier by increasing the concentration of the salt. And yet, the water concentration has an influence on the separation, and as the water concentration increases, the easier is the separation.

Therefore, the majority of TOC constituents can be removed by mixing hydrazine hydrate with the salt and subjecting the mixture to a distillation procedure to distill out the TOC constituents together with water. However, in the case of further decreasing the TOC concentration in the solution of purified hydrazine hydrate, it is necessary to distill the low volatile substances out. For this purpose, an aqueous solution of hydrazine hydrate and a solution containing the salt are fed separately from each other. The salt-containing aqueous solution is fed to an upper stage of a distillation column and the aqueous solution of hydrazine hydrate is fed to a stage lower than the stage to which the salt-containing aqueous solution is fed. Namely, the salt-containing solution is fed in the vicinity of the top of a distillation column where the concentration of hydrazine hydrate is low. Preferably, the salt-containing solution is fed to that stage of the distillation column where the concentration of hydrazine hydrate decreases to 35% by weight or less. In the vicinity of this stage, it is easy to separate the low volatile substances.

FIG. 1 is a flow chart showing one of the preferred embodiments of this invention in which a salt-containing solution is fed in the vicinity of a distillation column top. In FIG. 1, A indicates a concentration-distillation step, B indicates a hydrazine hydrate distillation step, 1 indicates an aqueous solution of hydrazine hydrate to be fed, 2 indicates an aqueous solution of hydrazine hydrate containing the salt, 3 indicates water (containing TOC constituents), 4 indicates purified hydrazine hydrate, and 5 indicates a concentrate of hydrazine hydrate containing the salt.

Figure 2:
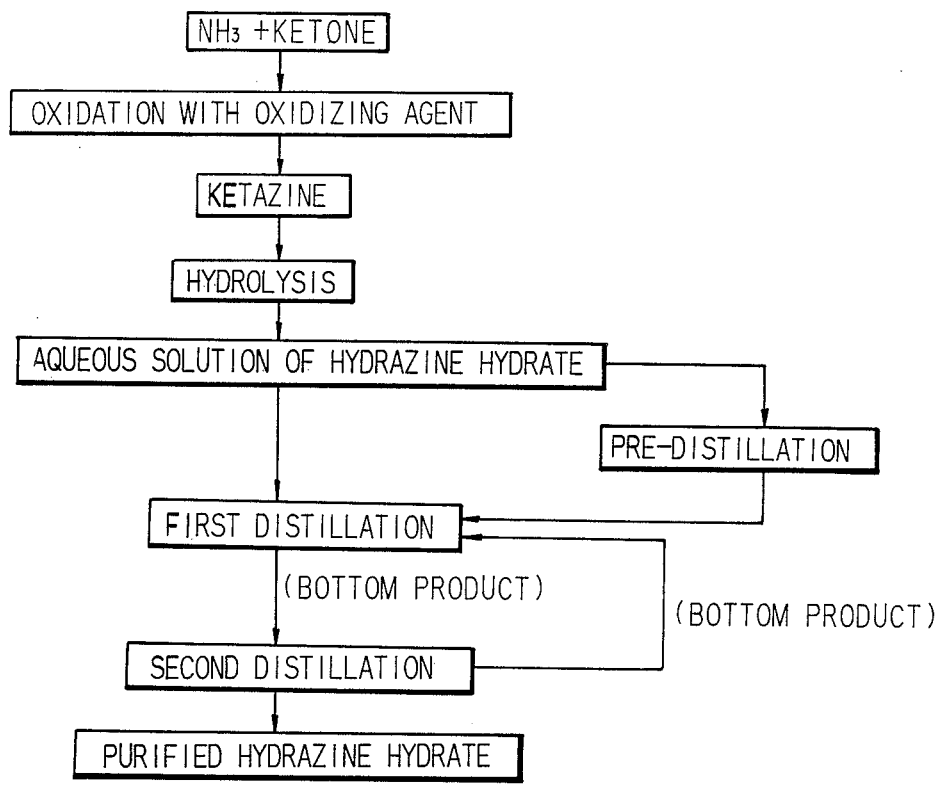
FIG. 2 is a flow chart showing a process for producing a purified hydrazine hydrate from ammonia, an oxidizing agent and a ketone as starting materials through a first step of the concentration-distillation and a second step of the distillation and recovery.

Oxidation of ammonia with an oxidizing agent in the presence of ketone gives ketazine. FIG. 2 is a flow chart showing a process for producing a purified hydrazine hydrate, which process comprises concentrating an aqueous solution of hydrazine hydrate resulting from hydrolysis of the above ketazine in the first step of the concentration-distillation and distilling the resultant concentrate in the second step of the distillation and recovery.

The conditions for the concentration-distillation step are as follows.

As the salt concentration in the system increases, it becomes easier to separate TOC constituents from hydrazine hydrate. Hence, it is desirable that the salt concentration be as high as possible. Preferably, it is adjusted such that the salt concentration in the bottom product is 10% by weight or more, in particular 15% by weight or more. When the salt concentration is over the above lower limit, the most part of TOC constituents can be distilled out together with water.

The higher concentration of hydrazine hydrate is economically preferable when it is fed, although even the lower concentration thereof does not make much difference. When the stability of hydrazine hydrate is taken into consideration, preferably, the pressure for the distillation is now higher than the vicinity of atmospheric pressure.

In the hydrazine hydrate distillation step, the bottom product having reduced TOC constituents, i.e., a concentrate obtained in the concentration-distillation step, is subjected to distillation to recover a purified hydrazine hydrate. Since the majority of TOC constituents is already removed in the concentration-distillation step, the object of the distillation step here is to separate hydrazine hydrate from the salt and impurities having higher boiling points than that of hydrazine hydrate.

In this distillation step, it is desirable to recycle the bottom product, i.e., a solution containing the salt to the concentration-distillation step. Preferably, the concentration of the salt in the bottom product is as high as possible. Then, in the concentration-distillation step, the recycled salt works to easily remove TOC constituents. It is preferable that the maximum concentration of the salt is the same as its solubility at a temperature of the solution. When the salt concentration exceeds the solubility, crystals are deposited, the solution viscosity becomes very high, and the like, which results cause operational difficulty.

The distillation may be carried out under elevated pressure or reduced pressure. Preferably, however, the distillation can be carried out at pressure not higher than the vicinity of atmospheric pressure.

This invention can be carried out in both batch method and continuous method. When this invention is industrially carried out, the continuous method is preferable from the viewpoint of operation. In the batch method, it is naturally possible to carry out the above-mentioned two steps by using the same apparatus.

Dihydrazinium sulfate, hydrazinium monochloride, etc., may be prepared in situ.

In the case when the salt is recycled between the two steps, the accumulation of TOC constituents and other impurities in the salt is scarcely observed when an aqueous solution of hydrazine hydrate purified in a pre-distillation step is used. However, if an aqueous solution of hydrazine hydrate obtained by mere hydrolysis of ketazine is used, the accumulation of high-boiling-point impurities in the salt is observed since the high-boiling-point impurities are contained in the aqueous solution of hydrazine hydrate. Therefore, when the salt is recycled, the salt is required to be little by little replaced by a fresh salt, or the impurities accumulated in the salt are required to be removed by some method (e.g., extraction, filtration, etc.) depending upon the amount of the accumulated impurities.

According to this invention, it is possible to reduce the TOC concentration in hydrazine hydrate produced from ketazine to a very low value.

The following Examples will explain this invention more in detail.

The TOC concentrations in the Examples were measured in the following method.

A sample to be measured was diluted with distilled water such that the TOC concentration in the sample was not higher than 50 ppm. Then, 10 $\mu$l of the diluted sample was injected to an analyzer of total organic carbon (produced by Shimazu Seisakusho Co., Ltd. TOC-500 type) by microsyringe and the TOC concentration was measured.

The calibration curve was prepared in advance by using a potassium hydrogen phthalate as a standard sample. The concentration of the TOC was calculated based on the calibration curve by using the above concentration of the TOC. The TOC concentrations are expressed as that of the undiluted measuring sample.

A sample to be measured was diluted with distilled water such that the TOC concentration in the sample was 50 ppm or lower. Then, 10 $\mu$l of the diluted sample was injected to an analyzer of total organic carbon (produced by Shimazu Seisakusho Co., Ltd. TOC-500 type) by microsyringe and the TOC concentration was measured.

The calibration curve was prepared in advance by using a potassium hydrogen phthalate as a standard sample. The concentration of the TOC was calculated based on the calibration curve by using the above data of the TOC concentrations. The TOC concentration are expressed as that of the undiluted measuring sample.

In the examples and comparative examples, "%" stands for "% by weight".

EXAMPLE 1

A 60% aqueous solution of hydrazine hydrate having 630 ppm of TOC, which was obtained by oxidation of ammonia with hydrogen peroxide in the presence of methylethyl ketone and pre-distillation of the resulting product, was fed at 60 g/hr to the 10th stage from the bottom in an Oldershaw type distillation column having 40 stages in the concentration-distillation step. On the other hand, a solution of 4% water, 16% hydrazine hydrate (containing no TOC) and 80% dihydrazinium sulfate was fed to the 10th stage (having 20% hydrazine hydrate) from the top at a rate of 40 g/hr.

At atmospheric pressure, water was distilled out of the top at a rate of 8.6 kg/hr, and the resultant bottom product (containing 35% of the salt) was subjected to simple distillation at reduced pressure of 150 torr in the hydrazine hydrate distillation step to give 51.4 g/hr of 70% hydrazine hydrate containing 52 ppm of TOC. An aqueous solution of hydrazine hydrate and dihydrazinium sulfate obtained as a bottom product was recycled 10 times. Accumulated impurities were hardly observed.

EXAMPLE 2

A 100% hydrazine hydrate having 720 ppm of TOC, which was obtained by oxidation of ammonia with sodium hypochlorite in the presence of methylethyl ketone and pre-distillation of the resulting product, was treated in the same apparatus used in Example 1.

In the concentration-distillation step, the hydrazine hydrate was fed to the 5th stage from the bottom at 40 g/hr together with water at 10 g/hr. At the same time, a solution of 10% hydrazine hydrate (containing no TOC) and 90 dihydrazinium sulfate was fed to 10th stage (having 4% hydrazine hydrate) from the top at a rate of 10 g/hr.

At atmospheric pressure, water was distilled out of the top at a rate of 10 g/hr, and the resultant bottom product (containing 18% of the salt) was subjected to simple distillation at reduced pressure of 70 torr in the hydrazine hydrate distillation step to give 40 g/hr of 100% hydrazine hydrate containing 90 ppm of TOC. A solution of dihydrazinium sulphate obtained as a bottom product was recycled 6 times. Accumulated impurities were hardly observed.

EXAMPLE 3

A 100% hydrazine hydrate having 870 ppm of TOC, which was obtained by oxidation of ammonia with hydrogen peroxide in the presence of methylethyl ketone and pre-distillation of the resulting product, was treated in the same apparatus used in Example 1.

In the concentration-distillation step, the hydrazine hydrate was fed to the 5th stage from the bottom at a rate of 40 g/hr together with water at a rate of 10 g/hr. At the same time, a solution of 20% hydrazine hydrate (containing no TOC) and 80% dihydrazinium sulphate was fed to the 10th stage (having 32% hydrazine hydrate) from the top at a rate of 70 g/hr.

At atmospheric pressure, water was distilled out of the top at a rate of 10 g/hr, and the resultant bottom product (containing 51% of the salt) was subjected to simple distillation at reduced pressure of 70 torr in the hydrazine hydrate distillation step to give 40 g/hr of 100% hydrazine hydrate containing 65 ppm of TOC. A solution of hydrazine hydrate and dihydrazinium sulphate obtained as a bottom product was recycled 5 times. Accumulated impurities were hardly observed.

EXAMPLE 4

A 44% aqueous solution of hydrazine hydrate having 3,500 ppm of TOC, which was obtained by oxidation of ammonia with hydrogen peroxide in the presence of methylethyl ketone, was treated in the same apparatus used in Example 1.

In the concentration-distillation step, the aqueous solution of the hydrazine hydrate was fed to the 15th stage from the bottom at a rate of 97 g/hr. At the same time, a solution of 4% water, 22% hydrazine hydrate and 74% dihydrazinium sulphate was fed to the 10th stage (having 25% hydrazine hydrate) from the top at a rate of 223 g/hr.

At atmospheric pressure, water was distilled out of the top at a rate of 46.2 g/hr, and the resultant bottom product (having 60% concentration of the salt) was subjected to simple distillation at reduced pressure of 70 torr in the hydrazine hydrate distillation step to give 50.8 g/hr of 84% hydrazine hydrate containing 230 ppm of TOC. A solution of hydrazine hydrate and dihydrazinium sulphate obtained as a bottom product was recycled 10 times. An accummulation of impurities reached 2.5%. However, there was almost no decrease in the effect.

EXAMPLE 5

A 60% aqueous solution of hydrazine hydrate having 630 ppm of TOC, which was obtained by oxidation of ammonia with hydrogen peroxide in the presence of methylethyl ketone and pre-distillation of the resulting product, was treated in the same apparatus used in Example 1.

In the concentration-distillation step, the aqueous solution of the hydrazine hydrate was fed to the 15th stage from the bottom at a rate of 60 g/hr. At the same time, a solution of 15% water, 67% hydrazine hydrate (containing no TOC) and 18% sodium chloride was fed to the 10th stage (having 32% hydrazine hydrate) from the top at a rate of 83 g/hr.

At atmospheric pressure, water was distilled out of the top at a rate of 15 g/hr, and the resultant bottom product (containing 12% of the salt) was subjected to simple distillation at reduced pressure of 150 torr in the hydrazine hydrate distillation step to give 45 g/hr of 80% hydrazine hydrate containing 180 ppm of TOC.

EXAMPLE 6

A 48% aqueous solution of hydrazine hydrate having 500 ppm of TOC, which was obtained by oxidation of ammonia with hydrogen peroxide in the presence of methylethyl ketone and pre-distillation of the resulting product, was treated in the same apparatus used in Example 1.

In the concentration-distillation step, the aqueous solution of the hydrazine hydrate was fed to the 15th stage from the bottom at a rate of 66.5 g/hr. At the same time, a solution of 2.4% water, 9.8% hydrazine hydrate (containing no TOC) and 87.8% hydrazinium monophosphate was fed to the 10th stage (having 4.5% hydrazine hydrate) from the top at a rate of 38.5 g/hr.

At atmospheric pressure, water was distilled out of the top at a rate of 26.5 g/hr, and the resultant bottom product (having 32% of the salt) was subjected to simple distillation at reduced pressure of 150 torr in the hydrazine hydrate distillation step to give 40 g/hr of 80% hydrazine hydrate containing 115 ppm of TOC.

EXAMPLE 7

A 40% aqueous solution of hydrazine hydrate having 580 ppm of TOC, which was obtained by oxidation of ammonia with hydrogen peroxide in the presence of methylethyl ketone and pre-distillation of the resulting product, was treated in the same apparatus used in Example 1.

In the concentration-distillation step, the aqueous solution of the hydrazine hydrate was fed to the 15th stage from the bottom at a rate of 90 g/hr. At the same time, a solution of 17% water, 63% hydrazine hydrate and 20% potassium carbonate was fed to the 10th stage (having 27% hydrazine hydrate) from the top at a rate of 120 g/hr.

At atmospheric pressure, water was distilled out of the top at a rate of 30 g/hr, and the resultant bottom product (having 13% of the salt) was subjected to simple distillation at reduced pressure of 150 torr in the hydrazine hydrate distillation step to give 60 g/hr of 60% hydrazine hydrate containing 205 ppm of TOC.

COMPARATIVE EXAMPLE 1

In the concentration-distillation step, a 40% aqueous solution of hydrazine hydrate having 3,200 ppm of TOC, which was obtained by oxidation of ammonia with hydrogen peroxide in the presence of methylethyl ketone, was fed, at a rate of 90 g/hr, to 15th stage from the bottom of the same apparatus as in Example 1.

At atmospheric pressure, water was distilled out of the top to concentrate the hydrazine hydrate to 96%. In the hydrazine hydrate distillation step, the above concentrated hydrazine hydrate was subjected to simple distillation at reduced pressure of 70 torr to give 37.5 g/hr of 96% hydrazine hydrate containing 620 ppm of TOC.

COMPARATIVE EXAMPLE 2

In the concentration-distillation step, a 60% aqueous solution of hydrazine hydrate having 630 ppm of TOC, which was obtained by oxidation of ammonia with hydrogen peroxide in the presence of methylethyl ketone, was fed at a rate of 60 g/hr to 15th stage from the bottom of the same apparatus as in Example 1.

At atmospheric pressure, water was distilled out of the top to concentrate the hydrazine hydrate to 100%. In the hydrazine hydrate distillation step, the above concentrated hydrazine hydrate was subjected to simple distillation at reduced pressure of 70 torr to give 36 g/hr of 100% hydrazine hydrate containing 670 ppm of TOC.

What we claim is:

1. A process for producing a purified hydrazine hydrate having a low total organic carbon concentration comprising:
    a first step which comprises distilling an aqueous solution of hydrazine containing organic carbon constituents in the presence of at least one salt selected from the group consisting of chloride, sulfate, phosphate and carbonate of (a) the metals of Group Ia and IIa of the Periodic Table of the Elements, (b) ammonium or (c) hydrazinium to concentrate the aqueous solution of hydrazine hydrate by distilling water and the majority of the total organic carbon constituents off and separating the resultant concentrate as a bottom product, and
    a second step which comprises distilling the resultant concentrate to recover a purified aqueous solution of hydrazine hydrate as a top product and separating an aqueous solution of the above salt as a bottom product,
    the said first step being carried out by feeding the salt in aqueous solution form to an upper stage of a distillation column and feeding the aqueous solution of hydrazine hydrate to a stage lower than the stage to which the aqueous solution of the salt is fed.

2. A process for producing a purified hydrazine hydrate according to claim 1 wherein the aqueous solution of hydrazine hydrate to be distilled in the first step is a product of hydrolysis of a ketazine.

3. A process for producing a purified hydrazine hydrate according to claim 2 wherein the ketazine is a product of oxidation of ammonia with an oxidizing agent in the presence of a ketone.

4. A process for producing a purified hydrazine hydrate according to claim 1 wherein the aqueous solution of hydrazine hydrate to be distilled in the first step is a distillate obtained by pre-distillation of a product of hydrolysis of a ketazine.

5. A process for producing a purified hydrazine hydrate according to claim 1 wherein the chloride is lithium chloride, sodium chloride, potassium chloride, magnesium chloride, calcium chloride, barium chloride, strontium chloride, ammonium chloride or hydrazinium monocholoride.

6. A process for producing a purified hydrazine hydrate according to claim 1 wherein the sulfate is sodium sulfate, potassium sulfate, magnesium sulfate, ammonium sulfate or dihydrazinium sulfate.

7. A process for producing a purified hydrazine hydrate according to claim 1 wherein the sulfate is dihydrazinium sulfate.

8. A process for producing a purified hydrazine hydrate according to claim 1 wherein the phosphate is sodium phosphate, potassium phosphate or hydrazinium phosphate.

9. A process for producing a purified hydrazine hydrate according to claim 1 wherein the carbonate is sodium carbonate or potassium carbonate.

10. A process for producing a purified hydrazine hydrate according to claim 1 wherein in the first step the distillation is carried out to give a concentration of the salt, in the bottom product, of 10% by weight or more.

11. A process for producing a purified hydrazine hydrate according to claim 1 wherein the solution of the salt separated as the bottom product in the second step is re-used as the salt in the first step.

12. A process for producing a purified hydrazine hydrate according to claim 1 wherein the salt is sulfate or phosphate.

13. A process for producing a purified hydrazine hydrate according to claim 1 wherein the salt is sulfate.

14. A process for producing a purified hydrazine hydrate having a low total organic carbon concentration comprising:
    a first step which comprises distilling an aqueous solution of hydrazine containing organic carbon constituents in the presence of at least one salt selected from the group consisting of chloride, sulfate, phosphate and carbonate of (a) the metals of Group Ia and IIa of the Periodic Table of the Elements, (b) ammonium or (c) hydrazinium to concentrate the aqueous solution of hydrazine hydrate by distilling water and the majority of the total organic carbon constituents off and separating the resultant concentrate as a bottom product, and
    a second step which comprises distilling the resultant concentrate to recover a purified aqueous solution of hydrazine hydrate as a top product and separating an aqueous solution of the above salt as a bottom product,
    the said first step being carried out by feeding the salt in aqueous solution form to an upper stage of a distillation column where the concentration of hydrazine hydrate is 35% by weight or less.

* * * * *

UNITED STATES PATENT AND TRADEMARK OFFICE
CERTIFICATE OF CORRECTION

PATENT NO. : 4,963,232

DATED : October 16, 1990

INVENTOR(S) : YASUHISA KURIYAMA; SHUUZABU SAKAGUCHI; TOSHIAKI KOHZAKI and SYOICHI NITO It is certified that error appears in the above-identified patent and that said Letters Patent is hereby corrected as shown below:

Column 9, line 46, after "hydrazine" insert --hydrate--.

Column 10, line 49, after "hydrazine" insert --hydrate--.

Column 10, line 65, delete "an upper" and insert therefor --a--.

Signed and Sealed this

Twenty-fourth Day of November, 1992

Attest:

DOUGLAS B. COMER

*Attesting Officer*   Acting Commissioner of Patents and Trademarks